(12) United States Patent
Laurencot et al.

(10) Patent No.: US 9,107,244 B2
(45) Date of Patent: Aug. 11, 2015

(54) GLASS PANEL HAVING ULTRASONICALLY INTEGRATED CONDUCTING WIRES

(75) Inventors: Laetitia Laurencot, Margny les Compiegne (FR); Adèle Verrat-Debailleul, Villers sur Coudun (FR); Andreas Schlarb, Herzogenrath (DE); Mitja Rateiczak, Würselen (DE); Christoph Degen, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 352 days.

(21) Appl. No.: 13/513,512

(22) PCT Filed: Dec. 2, 2010

(86) PCT No.: PCT/FR2010/052598
§ 371 (c)(1),
(2), (4) Date: Nov. 13, 2012

(87) PCT Pub. No.: WO2011/067541
PCT Pub. Date: Jun. 9, 2011

(65) Prior Publication Data
US 2013/0056246 A1 Mar. 7, 2013

(30) Foreign Application Priority Data

Dec. 4, 2009 (FR) ...................................... 09 58663

(51) Int. Cl.
*H05K 1/09* (2006.01)
*B60L 1/02* (2006.01)
*H05B 3/84* (2006.01)

(52) U.S. Cl.
CPC ............ *H05B 3/84* (2013.01); *H05B 2203/017* (2013.01); *Y02B 30/26* (2013.01)

(58) Field of Classification Search
CPC ............ H05B 3/84; H05B 3/86; H05B 3/845; H05B 6/00; H05B 2203/017; H05K 2201/10287
USPC ................... 174/251, 255, 256; 362/509, 92; 219/201–203, 219, 552, 553
See application file for complete search history.

(56) References Cited

U.S. PATENT DOCUMENTS 3,440,408 A 4/1969 Brittan
3,601,583 A * 8/1971 Fujiwara ...................... 219/522

(Continued)

FOREIGN PATENT DOCUMENTS

EP  0 553 025  7/1993
EP  0 613 769  9/1994

(Continued)

OTHER PUBLICATIONS

International Search Report as issued for International Application No. PCT/FR2010/052598, dated Apr. 5, 2011.

*Primary Examiner* — Hoa C Nguyen
(74) *Attorney, Agent, or Firm* — Pillsbury Winthrop Shaw Pittman LLP

(57) ABSTRACT

A glazing and a process for manufacturing such a glazing, the glazing integrating a conducting wire, wherein a surface of the glazing includes a substrate made of a polymer material wherein the conducting wire is partly sunken and at the very most flush with the surface of the polymer material, or a substrate made of mineral glass or made of a polymer material onto which the conducting wire is adhesively bonded. The glazing can be applied in a transport vehicle, building trades, street furniture, interior fittings, electrical goods or electronics.

19 Claims, 2 Drawing Sheets

(56) References Cited

U.S. PATENT DOCUMENTS

Figure 1:
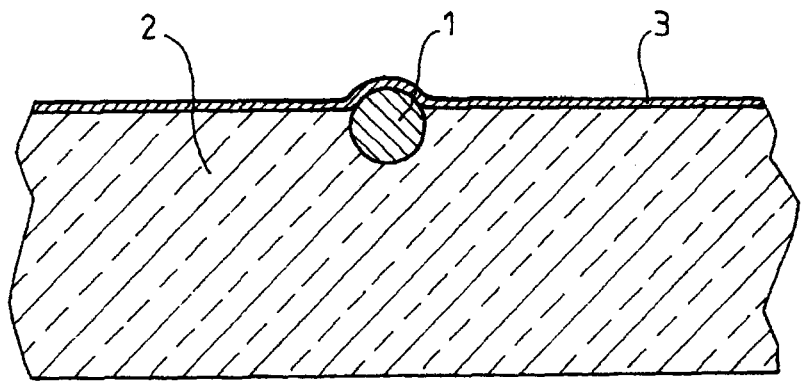

| | | | |
|---|---|---|---|
| 3,629,040 A * | 12/1971 | Hinton et al. | 228/180.1 |
| 4,209,687 A * | 6/1980 | Bethge et al. | 219/522 |
| 5,798,499 A * | 8/1998 | Shibata et al. | 219/203 |
| 6,024,904 A * | 2/2000 | Nanri | 264/104 |
| 6,563,086 B1 * | 5/2003 | Meirndorf et al. | 219/220 |
| 7,265,322 B2 * | 9/2007 | Aengenheyster et al. | 219/203 |
| 7,410,267 B2 | 8/2008 | Mochizuki | |
| 2006/0011615 A1 * | 1/2006 | Yamada | 219/553 |
| 2006/0050521 A1 * | 3/2006 | Mochizuki | 362/459 |
| 2006/0278803 A1 | 12/2006 | Mochizuki | |

FOREIGN PATENT DOCUMENTS

| | | |
|---|---|---|
| EP | 0 788 294 | 8/1997 |
| WO | WO 03/026869 | 4/2003 |
| WO | WO 2009/059980 | 5/2009 |

* cited by examiner

GLASS PANEL HAVING ULTRASONICALLY INTEGRATED CONDUCTING WIRES

CROSS-REFERENCE TO RELATED APPLICATIONS

This application is the U.S. National Stage of PCT/FR2010/052598, filed Dec. 2, 2010, which in turn claims priority to French Application No. 0958663, filed Dec. 4, 2009. The content of these applications are incorporated herein by reference in their entirety.

The invention relates to glazings comprising conducting wires, either demisting/deicing heating wires, or wires capable of constituting an antenna, or of supplying a wiper motor, a stop light, LEDs, a rain sensor, etc. The glazing then consists, in particular, of a rear window or a motor vehicle windshield.

The term glazing is essentially understood to mean the achievement of high optical and safety performances, satisfying the various standards in force throughout the world.

The glazing is organic, constituted of a polymer such as polycarbonate (PC), acrylic such as polymethyl methacrylate (PMMA), polyester such as polyethylene terephthalate (PET), polyolefin such as polyethylene (PE), polyvinyl chloride (PVC), polyurethane (PU), polyvinyl acetal and in particular polyvinyl butyral (PVB)—as an intermediate adhesive layer in a laminate—ionomer resin, etc., or made of mineral glass, for example soda-lime-silica glass.

The glazing is monolithic or laminated, that is to say constituted of several sheets joined to one another by intermediate adhesive layers such as the aforementioned PVB or PU.

It may be single or multiple glazing, that is to say comprising insulating gaps of dry gas.

Several processes are known for producing lines or other conducting patterns on a glazing.

Screen-printed lines are known.

The insertion of conducting wires on the PVB intermediate adhesive layer of a laminated glazing, by applying a certain heat combined with a pressure, is also known. The conducting wires are trapped between the two sheets of glass. This technique is described in documents EP 553 025 and EP 613 769.

Also known from document WO 2003/026 869 is a process in which conducting wires are inserted into a film of a first plastic material, onto which a second plastic material, compatible with or identical to the first, is injection molded so that the wires are completely encapsulated, embedded in the final product.

These techniques are complex implementations, the processes comprising numerous steps. Production difficulties remain, in particular for glazings of ever more complex geometries, having very pronounced curvatures and/or that are spherical, especially with regard to the high optical performances targeted.

Moreover, document U.S. Pat. No. 7,410,267 describes the insertion of heating wires into a headlight cover made of transparent plastic by means of ultrasonic waves. However, high optical performances are not required, since such a cover is, conversely, designed with a conformation such that it is not possible to see through it without deformation.

The objective of the invention is therefore the provision of a simple and reliable process for manufacturing a glazing with conducting wires and high optical performances.

For this purpose, one subject of the invention is a glazing integrating a conducting wire, which is distinguished by the fact that a surface of the glazing comprises a substrate made of a polymer material wherein the conducting wire is partly sunken and at the very most flush with the surface of the polymer material, or a substrate made of mineral glass or made of a polymer material onto which the conducting wire is adhesively bonded.

By the fact that the conducting wire is at the very most flush with the surface of the polymer material it is ruled out, according to the invention, that it is completely embedded in the latter, that is to say covered on all sides with a certain measurable thickness thereof.

It has in fact been found that an arrangement of the conducting wire at the surface of the glazing and as such a protuberance or being flush in this way, is perfectly and simply achievable even with complex glazing shapes, and is capable of guaranteeing high optical performances.

In the case of the conducting wire partly sunken into a substrate made of a polymer material, this sinking in is for example at least 40%, preferably 50% of the diameter of the wire, and at most 90%, preferably 85% of the diameter of the wire.

By way of indication, a tungsten wire with a diameter of 35 µm protrudes by 7 to 13 µm from a polycarbonate substrate, and a copper wire having a diameter of 71 µm protrudes by 19 to 34 µm.

Preferably, the conducting wire forms, at the surface of the glazing, an overthickness of at least 3 µm, particularly preferably 5 µm.

In a first preferred variant, the conducting wire is covered with a coating for protection from the glazing, having a thickness at most equal to 18 µm. This protective coating may consist of a layer that improves the mechanical strength of the polymer material substrate, made of an antiscratch varnish of polysiloxane type and its associated primer layer. The thickness of the antiscratch varnish may be from 3.5-12 µm, especially around 10 µm, that of the primer from 1.5-6 µm, especially around 5 µm.

The protrusion of the conducting wire relative to the polymer material substrate, having a value of at least 10% of the diameter of the wire as seen above, is therefore advantageously found at the surface of the final product, constituted for example of the antiscratch varnish, in the form of an overthickness of at least 3 µm, as also already mentioned.

However, if the conducting wire is flush with the surface of the polymer material, the protective coating/antiscratch varnish that covers it does not have any overthickness, while also remaining within the scope of the invention.

In a second variant, the conducting wire is exposed to the environment of the glazing. It may especially be at least partly sunken into a polymer material substrate through the antiscratch coating thereof. This embodiment does not rule out that the conducting wire may be coated with a residue of coating such as transparent-hot-melt adhesive. The conducting wire may moreover be flush with the surface of the antiscratch coating so that the surface thereof has practically no overthickness or irregularity.

In a third variant, the conducting wire is adhesively bonded to a substrate made of mineral glass or made of a polymer material. It is possible to imagine a wire having a rectangular or equivalent cross section, of which only the face in contact with the substrate is initially coated with transparent hot-melt adhesive, so that in the final product the conducting wire is really exposed to the environment of the glazing. In the case of a cylindrical conducting wire initially completely coated with hot-melt adhesive, residues of the latter may remain on any point of the surface of the wire in the final glazing.

To form the conducting wire, use may be made of aluminum, aluminum-covered copper, wires with a high delamination strength, copper-nickel alloys, brass, silver, gold, copper-tin alloys, aluminum-magnesium alloys, wires covered with another material, for example copper wires covered with nickel or black-painted wires, stainless steel. It is possible to use a wire of circular cross section, or a conductor of rectangular cross section.

Preferred examples for the conducting wire are:
a tungsten wire having a diameter between 15 and 150 µm;
a copper wire having a diameter between 25 and 250 µm.

Another subject of the invention is a process for manufacturing a glazing described above, wherein the conducting wire is integrated into the glazing by subjecting the conducting wire and a thermoplastic material forming a substrate and/or a coating of the conducting wire to the combined action of ultrasonic waves and pressure. The conducting wire is applied with pressure to the substrate using the head of a sonotrode.

When the substrate is made of a thermoplastic material of polycarbonate or equivalent type, this material melts via the action of the ultrasonic waves, and the wire is sunk into the substrate by applying a pressure.

When the substrate is made of mineral glass or of a polymer material, especially also thermoplastic material of polycarbonate type, the wire may be coated with a transparent hot-melt adhesive that melts under the action of the ultrasonic waves, and may be adhesively bonded to the substrate via the action of a pressure.

This process using ultrasonic waves is suitable for integrating conducting wires onto complex surfaces, even ones having pronounced curvatures, that are spherical, etc.

A sonotrode may be borne for this purpose by a robot suitable for integrating the wire onto a complex three-dimensional surface by controlling the pressure applied by the sonotrode to this surface.

Since this process can be applied for finishing intermediate quality-controlled parts, the yield losses are minimal.

The number of steps of the process is reduced compared to other known processes.

Another subject of the invention is the application of a glazing described previously for a land, air or aquatic transport vehicle, in particular as motor vehicle glazing, especially rear window glazing having a demisting/deicing function and/or antenna function, for the building trades, street furniture (bus shelter, display panel, etc.), interior fittings (furniture, glazed wall, wall lining, etc.), electrical goods or electronics.

Figure 2:
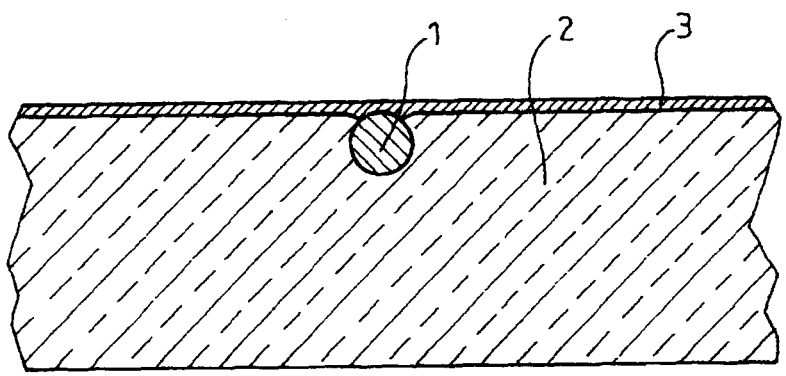

The invention is illustrated with reference to the appended figures, in which:

FIGS. 1 and 2, respectively 3 and 4 schematically represent a first, respectively a second, variant of the glazing of the invention, seen in cross section.

Figure 5A:
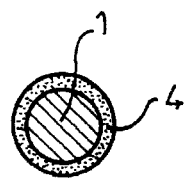

FIGS. 5a, respectively 5b, schematically represent a conducting wire seen in transverse cross section before it is combined with the glazing, respectively a third variant of the glazing of the invention, also seen in cross section.

FIG. 1 therefore represents a conducting wire 1 of tungsten having a diameter of 35 µm, respectively of copper having a diameter of 71 µm, sunk to a depth of 25 µm, respectively 46 µm, into a glazing 2 made of polycarbonate. In other words, the tungsten wire emerges 10 µm from the sheet of polycarbonate and the copper wire 25 µm.

This sinking of the wire is obtained by ultrasonic waves and application of a pressure.

The curvature of the rounded active end of the sonotrode used is chosen depending on the curvature of the substrate treated. The sonotrode is mounted on a head referred to as a module which is itself mounted on a robot. The module comprises a spring, the stiffness of which determines the pressure applied by the sonotrode to the substrate.

The generator has a frequency of 30 kHz and a power of 1000 W that can be adapted depending on the requirement, which gives the sonotrode a certain amplitude, preferably 80 µm.

An antiscratch coating 3 comprising a primer layer having a thickness of 5 µm and the coating itself having a thickness of 10 µm, consisting of polysiloxane, is then applied.

The height of protrusion of the wire mentioned above (10 µm, 25 µm) may be reduced at the surface of the glazing, after formation of the antiscratch varnish; it is 6 µm for the tungsten wire and 17 µm for the copper wire.

The glazing from FIG. 2 differs from that from FIG. 1 only by the fact that the wire 1 is flush with the surface of the polycarbonate 2.

Figure 3:
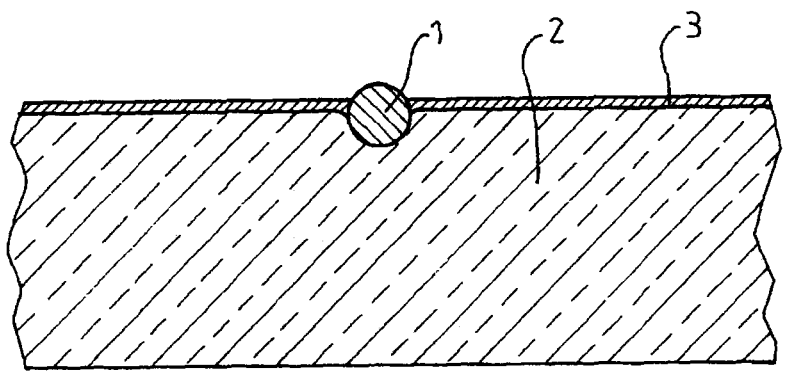

In the glazing from FIG. 3, the wire 1 is inserted into the glazing 2 after application of the antiscratch varnish 3.

The wire 1 emerges 10 µm from the glazing in the case of the tungsten wire and 25 µm in the case of the copper wire.

Figure 4:
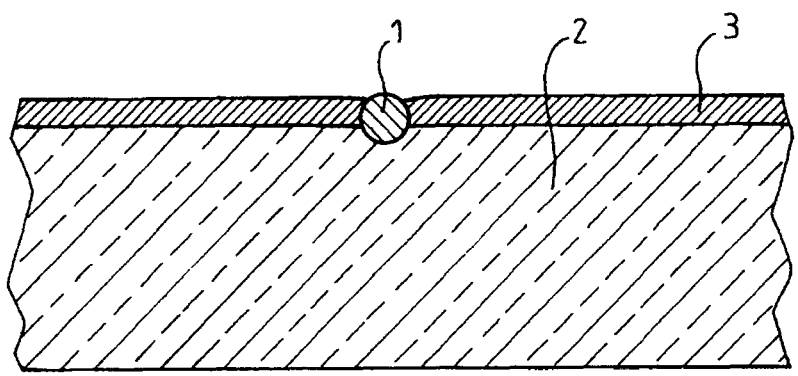

The glazing from FIG. 4 differs from that from FIG. 3 only by the fact that the wire 1 is flush with the surface of the antiscratch varnish 3.

The wire 1 from FIG. 5a is provided with a transparent hot-melt adhesive coating 4 in order to be adhesively bonded to a glazing 2 made of glass or made of a polymer material, according to the same process as described with reference to FIG. 1.

Figure 5B:
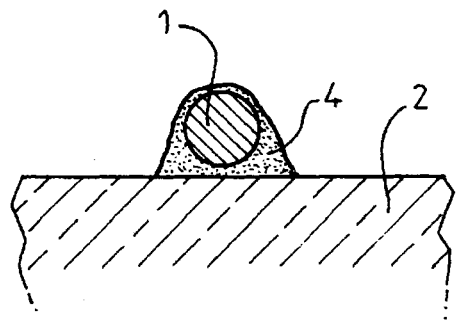

The glazing represented schematically in FIG. 5b is obtained. Here there is no insertion of the wire into the substrate.

The absence of optical defect is qualitatively observed for the five glazings represented in FIGS. 1, 2, 3, 4 and 5b, attested to by the absence of optical distortion in transmission that can be observed by the shadowgraph technique in the form of white marks and that can be quantified by Labscan® measurement (machine sold by ISRA Vision).

The absence of optical defect for the five glazings having integrated conducting wires is confirmed by projecting through them a luminous test pattern 4 m away from the glazing, and by observing the shadow on a screen also located 4 m away. The luminous test pattern comprises aligned dots and/or lines that are parallel then perpendicular to the conducting wires. These tests are carried out according to Regulation No. 43 (Annex 3, §9), additive 42, of the E/ECE/324, E/ECE/TRANS/505 agreement concerning the adoption of uniform technical prescriptions for wheeled vehicles, equipment and parts which can be fitted and/or be used on wheeled vehicles and the conditions for reciprocal recognition of approvals granted on the basis of these prescriptions.

The test pattern is not deformed by passing through the glazings.

Thus, a glazing equipped with conducting wires and having high optical performances is obtained by a simple process.

The invention claimed is:

1. A rear window or windshield of a motor vehicle comprising a glazing integrating a conducting wire, wherein the glazing comprises a substrate made of a polymer material, the substrate having a main surface that defines an external surface of the rear window or windshield, wherein the conducting wire is partly sunken and at the very most flush with the main surface of the substrate so that more than 50% of a diameter of the conducting wire is sunken into the polymer material.

2. The rear window or windshield of a motor vehicle as claimed in claim 1, wherein the conducting wire forms, at the main surface of the substrate, an overthickness of at least 3 µm.

3. The rear window or windshield of a motor vehicle as claimed in claim 2, wherein the overthickness is at least 5 μm.

4. The rear window or windshield of a motor vehicle as claimed in claim 1, wherein the external surface of the rear window or windshield is coated with a coating for protection of the glazing so that the conducting wire is covered with the coating, the coating having a thickness at most equal to 18 μm.

5. The rear window or windshield of a motor vehicle as claimed in claim 1, wherein the conducting wire is exposed to the environment of the glazing.

6. The rear window or windshield of a motor vehicle as claimed in claim 1, wherein the conducting wire is made of tungsten and has a diameter between 15 and 150 μm.

7. The rear window or windshield of a motor vehicle as claimed in claim 1, wherein the conducting wire is made of copper and has a diameter between 25 and 250 μm.

8. A process for manufacturing a rear window or windshield of a motor vehicle as claimed in claim 1, wherein the conducting wire is integrated into the glazing by subjecting the conducting wire and a thermoplastic material forming the substrate and/or a coating of the conducting wire to the combined action of ultrasonic waves and pressure.

9. The rear window or windshield of a motor vehicle as claimed in claim 1, wherein more than 60% of the diameter of the conducting wire is sunken into the substrate.

10. The rear window or windshield of a motor vehicle as claimed in claim 9, wherein at most 90% of the diameter of the conducting wire is sunken into the substrate.

11. The rear window or windshield of a motor vehicle as claimed in claim 10, wherein at most 85% of the diameter of the conducting wire is sunken into the substrate.

12. The rear window or windshield of a motor vehicle as claimed in claim 1, wherein the motor vehicle is a land, air or aquatic transport vehicle.

13. A rear window or windshield of a motor vehicle comprising a glazing integrating a conducting wire, wherein the glazing comprises a substrate made of a polymer material, the substrate having a main surface that defines an external surface of the rear window or windshield, wherein the conducting wire is partly sunken and at the ver most flush with the main surface of the substrate so that more than 50% of a diameter of the conducting wire is sunken into the polymer material, wherein the external surface of the rear window or windshield is coated with an antiscratch coating and the conducting wire is partly sunken in the antiscratch coating so that the conducting wire is at the very most flush with an upper surface of the antiscratch coating.

14. The rear window or windshield of a motor vehicle as claimed in claim 13, wherein the conducting wire is made of tungsten and has a diameter between 15 and 150 μm.

15. The rear window or windshield of a motor vehicle as claimed in claim 13, wherein the conducting wire is made of copper and has a diameter between 25 and 250 μm.

16. The rear window or windshield of a motor vehicle as claimed in claim 13, wherein the antiscratch coating includes a primer layer and an antiscratch varnish.

17. The rear window or windshield of a motor vehicle as claimed in claim 16, wherein the antiscratch varnish has a thickness from 3.5 μm to 12 μm.

18. The rear window or windshield of a motor vehicle as claimed in claim 16, wherein the primer layer has a thickness from 1.5 μm to 6 μm.

19. The rear window or windshield of a motor vehicle as claimed in claim 13, wherein the conducting wire is partly sunken in the antiscratch coating after forming the antiscratch coating so that a thickness of the antiscratch coating at a top of the conducting wire is less than a thickness of the antiscratch coating on the external surface.

* * * * *

UNITED STATES PATENT AND TRADEMARK OFFICE
CERTIFICATE OF CORRECTION

| | | |
|---|---|---|
| PATENT NO. | : 9,107,244 B2 | Page 1 of 1 |
| APPLICATION NO. | : 13/513512 | |
| DATED | : August 11, 2015 | |
| INVENTOR(S) | : Laetitia Laurencot et al. | |

It is certified that error appears in the above-identified patent and that said Letters Patent is hereby corrected as shown below:

In the claims,
Column 6, line 6
    replace "ver most flush..."
    with -- very most flush... --

Signed and Sealed this
First Day of March, 2016

Michelle K. Lee
*Director of the United States Patent and Trademark Office*